United States Patent Office 3,573,073
Patented Mar. 30, 1971

3,573,073
GLASS-CERAMIC ARTICLE AND METHOD
David A. Duke, 7 Theresa Drive, Corning, N.Y. 14830;
Bruce R. Karstetter, R.D. 1, Chatfield Place, Painted
Post, N.Y. 14870; Stanley S. Lewek, 187 N. Place,
Corning, N.Y. 14830; and Robert W. Pfitzenmaier, 32
Elm St., Canisteo, N.Y. 14823
No Drawing. Continuation-in-part of abandoned application Ser. No. 365,201, May 5, 1964. This application Mar. 18, 1968, Ser. No. 714,015
Int. Cl. C03c *3/22*
U.S. Cl. 106—39                                     8 Claims

ABSTRACT OF THE DISCLOSURE

This invention relates to the strengthening of glass-ceramic articles wherein the crystal content thereof constitutes the predominant portion and containing nepheline as the principal crystal phase. The strengthening is effected through an ion exchange reaction occurring within a surface layer of the glass-ceramic article wherein potassium ions from an external source are exchanged for sodium ions in the nepheline to convert the nepheline at least in part to kalsilite and cause compressive stresses to be developed in the surface layer.

---

This application is a continuation-in-part of our pending application, Ser. No. 365,201, filed May 5, 1964, now abandoned.

A glass-ceramic article in is the result of a carefully controlled crystallization in situ of a glass article. Thus, the manufacture of glass-ceramic articles contemplates three general steps: first, a glass-forming batch commonly containing a nucleating agent is compounded; second, this batch is melted and the melt cooled and shaped to a glass article of a desired configuration; and, third, the resultant glass article is subjected to a particular heat treating schedule which causes nuclei to be initially developed in the glass which provide sites for the growth of crystals thereon as the heat treatment is continued.

Inasmuch as this crystallization in situ is accomplished through the substantially simultaneous growth on countless nuclei, the structure of a glass-ceramic article consists of relatively uniformly-sized, fine-grain crystals homogeneously dispersed in a residual glassy matrix, these crystals constituting the predominant proportion of the article. Hence, glass-ceramic articles are commonly defined as being as least 50% by weight crystalline and, frequently, are actually over 90% by weight crystalline. This very high crystallinity provides a product exhibiting chemical and physical properties which are normally quite different from those of the parent glass but are more nearly characteristic of those demonstrated by a crystalline article. Furthermore, the high crystallinity of the glass-ceramic article will result in the residual glassy matrix having a different composition from that of the parent glass since the crystal components will have been precipitated therefrom.

For a more complete discussion of the theoretical concepts and the practical considerations involved in the production of glass-ceramic articles, as well as a study of the mechanism appertaining to the crystallization in situ, reference is made to U.S. Pat. No. 2,920,971. It will be readily understood that the crystal phases developed in glass-ceramic articles depend upon the composition of the original glass and the heat treatment applied thereto. Glass-ceramic articles wherein nepheline comprises the principal crystal phase and a method for manufacturing such articles are disclosed in U.S. Pats. Nos. 3,146,141 and 3,201,266 filed respectively in the name of H. D. Kivlighn on Nov. 23, 1959 and in the name of J. F. Mac-Dowell on July 23, 1962 and assigned to a common assignee.

The diffusion of ions in any medium is a direct function of the structure of the medium itself. Hence, whereas a crystal has a long range ordered structure of ions, glass has only short range order and has even been deemed to consist of a random network of ions. This basic difference in structure greatly affects the ability of ions to diffuse therein.

The structure of glass is characterized by a network or framework composed of polyhedra of oxygen centered by small ions of high polarizing power (e.g. $Si^{+4}$, $B^{+3}$, $Al^{+3}$, $Ge^{+4}$, $P^{+5}$). These polyhedra are arranged in a generally random fashion so that only short range order exists. Thus silica glass is thought to be composed of a random network of $SiO_4$ tetrahedra, all of whose corners are shared with one another. In silicate glasses containing modifying oxides (e.g. $Na_2O$, $K_2O$ MgO, CaO, BaO, etc.) some of the shared corners (Si—O—Si bonds) are believed broken and oxygen ions are formed which are connected to only one silicon ion. The modifying ions remain in interstitial positions or structural vacancies. In modified aluminosilicate glasses, nonbridging oxygen ions are believed less common because as modifying ions are added to silicate glasses aluminum replaces silicon in the three-dimensional corner shared tetrahedral network and the modifying ions remain in the interstices with the retention of charge balance.

In either case the larger ions of lower valence (modifiers) are thought to occur geometrically in interstitial positions within the basic silicate or aluminosilicate framework. They can thus be considered as completely or at least partially surrounded by linked framework silica tetrahedra. In other words, these ions can be considered as present in "structural cages" in the network.

Since the glassy network is random, the size of these cages or potential modifier cation positions is variable and the number of cages is large with respect to the number of modifying ions. Therefore, it is likely that during ion exchange in a molten salt bath a small ion will jump out of a cage and a large ion will jump into another cage, very possible a larger one. Even if the exchangeable ion in the glass and the ions in the molten salt are similar in size, it is likely that an ion leaving one cage will be replaced by an ion entering a different and previously vacant cage. Thus ion exchange phenomena in a glassy network are structurally random and there is no guarantee that certain structural vacancies or positions filled before exchange will be filled after exchange.

The concept of exchanging ions within a crystal structure has been appreciated for many years. The term "ion exchange," as commonly used, refers to replacement reactions in clay and zeolite-type materials carried out in aqueous solutions at temperatures below 100° C. These materials generally consist of alternating, parallel, essentially two-dimensional layers which are stacked together with interlayer spaces therebetween. To maintain electroneutrality between these layers, cations are incorporated into the interlayer spaces. The extent and rate of exchange in these materials is a function not only of the concentrations of the exchanging species but also of the structure of the crystalline phase undergoing exchange. When these materials are suspended in an aqueous solution which can penetrate between the layers, these cations are freely mobile and can exchange with cations present in the solution. Hence, the cation exchange capacity of these materials arises principally from the replacement of cations at defined positions in the interlayer spaces. These interlayer spaces can be likened to channels and it will be apparent that this type of low temperature ion exchange will occur between the loosely bonded ions in a crystal and those in a solution only if there is a suitable channel within the crystal to allow diffusion to take place.

Isomorphous substitution in crystals involves the replacement of the structural cations within the crystal lattice by other cations. This type of substitution may be regarded as a form of ion exchange but the accomplishment thereof requires crystallizing the materials from melts of the appropriate composition. However, the amount and type of isomorphous substitutions can often be very important in affecting the character of a material which is to be subsequently subjected to the conventional low temperature ion exchange reaction described above.

The instant invention contemplates the use of high temperature ion exchange to effect substitutions within the crystalline lattice to thereby produce materials similar to those secured through isomorphous substitution. However, in contrast to glasses, high temperature ion exchange in crystals is much more restricted. The various ion species are specifically located in defined positions within the lattice. When an ion leaves a crystalline position, the position is generally filled by another ion from an external source of ions. The geometry of the crystals often restricts the size of the replacing ion. Isomorphous substitution in the crystal can only sometimes be of help in determining which ion pairs are exchangeable under the rigid conditions imposed by the long range repetitive order of crystals. Thus, for example, sodium ions can replace lithium ions in the beta-spodumene crystal structure but this exchange cannot take place in the beta-quartz or beta-eucryptite solid solution structure where the sodium ion appears to be too large for the structure to tolerate and the crystalline structure is destroyed if the exchange is forced to take place. As opposed to this, the sodium-for-lithium ion exchange can always be carried out in aluminosilicate glasses without any phase change.

Hence, in short, crystals, because of their definite geometry, impose stringent limitations upon ion exchange. Glasses, on the other hand, because they are random structures capable of incorporating almost all chemical species in a substantial degree, demonstrate no such basic restrictions.

Of course, the ability of a crystalline phase to accept another cation to replace an ion already in its structure through an ion-exchange mechanism is not necessarily useful. Many such exchanges will not lead to compressive stress and consequent strengthening. When strength is the desired goal, it is necessary to tailor the exchange to produce compressive stress in the exchanged layer. The compressive stress may arise through crowding of the existing structure or through transformation of that structure to one which comes under compression by some other mechanism; e.g., difference in coefficients of thermal expansion or density changes.

An application filed May 5, 1964, Ser. No. 365,117, in the name of R. O. Voss, assigned to a common assignee, and entitled "Glass-Ceramic Article and Method," now abandoned, discloses the general principles of ion exchange within the crystal phase of a glass-ceramic material containing exchangeable ions. This application also specifically discloses that glass-ceramic materials containing a beta-spodumene crystal phase are capable of having the lithium ion of such crystal phase exchanged for a sodium ion within a surface layer on the article, thereby compressively stressing such surface layer and greatly increasing the strength of the article.

We have found that, in accordance with the principles set forth in the Voss application, exchangeable ions larger than sodium ions, for example potassium ions, can be introduced into a glass-ceramic material containing a nepheline crystal phase. We have further found that, when such ion exchange is effected, the surface layer on the article may become compressively stressed and the mechanical strength of the article markedly increased.

Based on these and other discoveries, our invention resides in a glass-ceramic article characterized by an original nepheline crystal phase containing an exchangeable sodium ion, and by an integral compressively-stressed surface layer wherein the sodium content of the crystal phase is less than that of the interior of the body and the content of a larger exchangeable cation is correspondingly greater. The invention further resides in a method of producing such a glass-ceramic article having a chemically modified surface layer which comprises contacting a glass-ceramic body having a nepheline crystal phase containing an exchangeable sodium ion with a material containing a larger exchangeable cation, the time of contact being sufficient to effect an exchange between such ions and thereby chemically alter the surface layer on the glass-ceramic body.

Reference to a larger exchangeable cation in this application means a positive or metallic-type ion, e.g. a potassium ion, that is larger in ionic radius than a sodium ion and that is capable of migrating or diffusing in depth under an activating physical influence such as heat and being controllable by the application or removal of such physical influence.

It will be understood that the present invention is not concerned with the manner in which the glass-ceramic material is originally formed and may employ any glass-ceramic material containing a nepheline crystal phase regardless of its particular composition or method of formation. However, compositions with a relatively high alumina content, in particular a mole ratio of $Al_2O_3:Na_2O$ above one, seem to strengthen more easily, particularly in depths required to provide an abraded strength, that is strength not lost by surface abrasion.

Nepheline has a structure based on a tridymite-type framework in which about half of the silicon atoms are replaced by aluminum and electrical neutrality is maintained by the presence of alkali atoms within the structure. In the pure-sodium, end-member nepheline, $$Na_8Al_8Si_8O_{32}$$

the eight interframework sites have eight-fold oxygen coordination with an average cation-oxygen distance of about 2.65 A. It is possible to substitute larger ions into these eight coordinated sites through isomorphous substitution as in the naturally-occurring potassium and calcium solid solution series. This, however, necessitates high temperatures and relatively long times to effect such an exchange of ions in the interframework sites. We have been able to accomplish such an exchange of potassium ions for sodium ions in a molten salt bath although the reaction is somewhat slow. This reaction results in an increase in strength only because the surface phase yields compressive stress due to its larger volume.

The earlier mentioned Kivlighn patent discloses that glass-ceramics containing a nepheline crystal phase may be produced from glasses consisting essentially on a mole percent basis of 50–68% $SiO_2$, 16–34% $Al_2O_3$, 7–34% $Na_2O$, 0–15% CaO, 0–6% $K_2O$, the total $Na_2O$, CaO and $K_2O$, being from 15 to 34%, and the mole ratio of these oxides to $Al_2O_3$ not exceeding 1.7. A nucleating agent, viz 0.08–0.05% $Cr_2O_3$ or a titanate of a divalent metal oxide forming an ilmenite-type crystal structure in an amount of 2.9–12%, is incorporated in the glass and an article formed from such glass is heat treated at a temperature within a range of 800–1150° C. for a sufficient time to effect crystallization. Such heat treatment preferably includes a treatment at 800—850° C. for about 1–4 hours and a further treatment at 1000–1080° C. for about 6–12 hours.

The earlier mentioned MacDowell patent discloses glass compositions consisting essentially of 30–55% $SiO_2$, 28–38% $Al_2O_3$, 10–25% $Na_2O$, 1–20% BaO and 5–12% $TiO_2$ which may, with proper heat treatment, be nucleated and crystallized to produce glass-ceramics containing both nepheline and celsian crystal phases.

By way of illustration then, one may select a glass-ceramic article produced in accordance with either of these disclosures. Alternatively, any other glass-ceramic article containing a predominantly nepheline crystal phase, may also be employed.

In accordance with the present invention, the glass-ceramic article thus formed is brought in contact with a material containing a larger exchangeable cation at an elevated temperature and for a sufficient time to effect an exchange of such ions within a surface layer on the glass-ceramic body.

While some limited degree of ion exchange may occur as low as 200° C., it is generally necessary to employ higher temperatures of at least 400° C. to obtain an appreciable degree of ion exchange within a reasonable time. The melting temperature of a crystal phase theoretically limits the temperature employed. As a practical matter, however, availability of suitable molten salt materials, or other ion exchange media, and the tendency of such materials to chemically attack the material normally determines the temperature of a given ion exchange process. Therefore, 800° C. has been determined to be a practical maximum exchange temperature. The ion exchange process is a diffusion type process, and therefore the amount of exchange increases with the square root of time. However, an optimum level is reached insofar as strengthening is concerned, this level or depth depending on abrasion.

As explained in the Voss application, the extent of ion exchange and consequent chemical alternation in the article may be varied. For strengthening purposes, however, the exchange is effected in a surface layer on the article whereby a uniform compressively stressed surface layer is produced on the article.

To this end, it is desirable to surround the article with the ion exchange medium and utilize thermal influence to effect a uniform exchange over the article surface. Immersion in a molten salt bath is a particularly convenient mode of treatment, but other equivalent means may be adopted. The particular salt, or other exchange medium selected, will depend on temperature desired, corrosive tendencies of the material, and economics.

The ion exchange may ordinarily be observed by either chemical analysis, by X-ray diffraction pattern analysis, or by physical effect (e.g. stress development). In the case of X-ray analysis, it is observed that the pattern of the crystal phase in the surface layer after ion exchange is that of a different, although similar, crystal, kalsilite. This crystal is in the same system as nepheline, i.e. the hexagonal system, but there is a sufficient differentiation between the characteristic peaks of the two patterns to indicate the change in crystal form. See "The Nepheline-Kalsilite System: I. X-Ray Data for the Crystalline Phases," J. V. Smith and O. F. Tuttle, American Journal of Science, vol. 255, April 1957, pp. 282–305.

The term "nepheline" has been employed to designate a natural mineral having a crystal structure classified in the hexagonal crystal system and identified by the chemical formula $(Na,K)AlSiO_4$. However, it has been pointed out by Donnay et al. that the mineral nepheline exists in a wide range of solid solutions, the extent of which is not even fully brought out by the above formula (Paper No. 1309 of the Geophysical Laboratory entitled "Nepheline Solid Solutions").

A similar situation exists in the glass-ceramic art. Here again, the term "nepheline" is employed to designate a rather wide range of solid solution crystal phases having characteristics corresponding to those of the mineral. While the crystals may vary considerably in composition, they are essentially sodium or sodium-potassium-aluminum-silicate crystals in the hexagonal system and have a common X-ray diffraction peak pattern when studied by X-ray diffraction analysis. It will be understood, that, while any nepheline crystal will exhibit a characteristic pattern, the spacing and intensity of the peaks may vary somewhat depending on the nature of the crystal phase.

A preferred form of nepheline glass-ceramic for strengthening purposes, such material having a mixed sodium-potassium crystal phase, is fully disclosed in Ser. No. 642,318, filed May 31, 1967, in the names of D. A. Duke and B. R. Karsteter, assigned to a common asignee and entilted "Glass-Ceramic Article and Method," now abandoned.

As has been observed above, the ion exchange reaction described in this invention is time-temperature dependent. Thus, whereas an exchange time of greater than 100 hours may be required to impart a sizeable improvement in mechanical strength to the glass-ceramic articles, at 400° C., as little as two hours may be very adequate at 800° C. Our invention is not limited to the manner in which the glass-ceramic articles are formed and is generally applicable to the strengthening of any glass-ceramic article wherein the predominant crystal phase is nepheline. The preferred compositions consist of essentially $Na_2O$, $Al_2O_3$, and $SiO_2$ nucleated by $TiO_2$ with excellently strong articles being secured from compositions consisting essentially, by weight on the oxide basis, of about 25–50% $SiO_2$, 25–50% $Al_2O_3$, 5–20% $Na_2O$, and 5–10% $TiO_2$.

By way of further illustrating, but not limiting, our invention, a detailed description of its practice with respect to several specific embodiments thereof is now presented.

The following table sets forth a series of exemplary glass compositions formulated on an oxide basis in parts by weight:

|  | 1 | 2 | 3 | 4 |
|---|---|---|---|---|
| $SiO_2$ | 49.5 | 47.5 | 48 | 40 |
| $Al_2O_3$ | 26 | 28 | 34 | 32 |
| BaO |  |  |  | 16 |
| $Na_2O$ | 17 | 17 | 18 | 12 |
| $TiO_2$ | 5 | 5 | 8 | 8 |
| $As_2O_3$ | 0.5 | 0.5 | 0.5 |  |
| MgO | 2 | 2 |  |  |

Glass batches were mixed from conventional raw materials (sand, alumina, etc.) proportioned on the basis of each of these formulations. The batches were melted to essentially homogeneous glasses and drawn into quarter-inch diameter cane which were then cut into 4 inch lengths for test purposes.

The glass cane samples were then converted to the glass-ceramic state by appropriate heat treatments to produce a nepheline crystal phase in Examples 1–3 and a mixture of nepheline and celsian crystal phases in Example 4. The heat treating schedule employed for each glass was:

(1) and (2):
 200° C./hour to 680° C.
 60° C./hour to 1040° C.
 Hold 2 hours at 1040° C.
 Cool 200° C./hour.

(3):
 300° C./hour to 850° C.
 Hold 4 hours at 850° C.
 300° C./hour to 1100° C.
 Hold 4 hours at 1100° C.
 Cool in furnace.

(4):
 300° C./hour to 850° C.
 Hold 4 hours at 850° C.
 300° C./hour to 1160° C.
 Hold 4 hours at 1160° C.
 Cool in furnace.

The structure of the crystallized cane of each example was examined utilizing X-ray diffraction analysis and transmission and replica electron micrographs. Each cane sample was determined to be greater than about 70% by weight crystalline with nepheline constituting the predominant crystal phase. In Examples 1–3, the crystal phase consisted of less than about 5% anatase ($TiO_2$) with the remainder substantially all nepheline. In Example 4, celsian and hexacelsian (dimorphs of $BaO \cdot Al_2O_3 \cdot 2SiO_2$) comprised a total of about 20% of the crystalline material with anatase again being present in an amount less than about 5% and nepheline constituting essentially all of the remainder.

As was observed above, since the glass-ceramic articles of this invention are highly crystalline, not only is the amount of residual glassy matrix small but the composition thereof is very different from that of the original glass. Thus, in the preferred embodiment of the invention, substantially all of the alkali metal ions will be included in the crystal structure of the nepheline and other crystal phases present leaving a residual glassy matrix consisting primarily of silica. Some alkali metal ion in excess of that located in the crystal phase can be tolerated but amounts in excess of 5% by weight frequently yield a coarse-grained rather than the desired fine-grained article. Hence, although in the preferred embodiment of the invention, alkali metal ions are completely absent from the residual glassy matrix, a very minor amount can be present. It will be apparent that these "contaminant" sodium ions in the glassy matrix can also be exchanged with the potassium ions during the subsequent ion exchange reaction, but, it is equally evident that inasmuch as the quantity of such ions is very small and the total content of glass in the article is very small, the effect of such an exchange upon the properties of the article would be essentially negligible when compared with the exchange taking place within the nepheline crystals.

The glass-ceramic cane samples thus produced were then assembled into sets for ion exchange strengthening treatments. These treatments consisted in immersing each cane set in a molten potassium salt bath at a given temperature and for a selected time to effect an exchange of potassium ions from the salt bath with sodium ions from the nepheline crystals in a surface layer on the cane samples. Both the time and the temperature of the treatment were varied between sets in order to illustrate the effect of such variations of treatment. For temperatures of 600° C. and below, a potassium nitrate ($KNO_3$) bath was employed, while a bath composed of 52% potassium chloride (KCl) and 48% potassium sulfate ($K_2SO_4$) was employed for high temperature treatment.

After treatment in a salt bath, each cane sample was cleaned and mounted on spaced knife edges in a Tinius Olsen testing machine and a continuously increasing load applied opposite to and intermediate of the supports until the cane broke in flexure. From this measured breaking load, the modulus of rupture (MOR) value was calculated for each individual cane and an average value determined for each set of samples.

Prior to this flexure breaking test, certain of the sets of samples were subjected to a severe form of surface abrasion wherein a set of five cane samples was mixed with 200 cc. of 30 grit silicon carbide particles and subjected to a tumbling motion for 15 minutes in a Number 0 ballmill jar rotating at 90–100 r.p.m. The average MOR calculated for such an abraded set of samples is a measure of tumble abraded strength in contrast to unabraded strength for a set of samples which was not given any abrasive treatment. Inasmuch as the strength of these articles is directly dependent upon the surface compression layer developed thereon via the ion exchange reaction and, since essentially all service applications for these articles will involve surface injury even if only that experienced in normal handling, the practical or permanent strength demonstrated by the article is that which is exhibited after substantial surface abrasion. Therefore, the above-described tumble abrasion test is one which was first developed in the glass industry to simulate surface abuse which might be experienced by glass articles in field service and is believed to be equally appropriate with glass-ceramic articles. Preferably, the depth of the surface compression layer is at least 0.001" to impart reasonably good abraded strength to the article. This depth can be determined through electron microscope examination of a cross-section of the article.

The following table summarizes the various ion exchange treatments in terms of composition number, salt bath temperature (Temp.), time of treatment, and the average calculated MOR for each set of five samples.

| | Temp., °C. | Time, hours | MOR (p.s.i.), unabraded | MOR (p.s.i.), abraded |
|---|---|---|---|---|
| Composition: | | | | |
| 1 | | | 24,000 | 11,000 |
| 1 | 525 | 4 | 51,000 | 11,000 |
| 1 | 525 | 16 | 52,000 | 9,000 |
| 1 | 580 | 72 | | 44,000 |
| 2 | | | 21,000 | 12,000 |
| 2 | 525 | 4 | 60,000 | 8,000 |
| 2 | 525 | 16 | 69,000 | 10,000 |
| 3 | 590 | 8 | | 12,000 |
| 3 | 590 | 96 | | 87,000 |
| 3 | 730 | 8 | | 74,000 |
| 3 | 775 | 8 | | 123,000 |
| 4 | 500 | 4 | | 10,000 |
| 4 | 550 | 64 | | 57,000 |

From these data, it will be readily seen that an unabraded strength increase may be readily imparted to a nepheline glass-ceramic by potassium ion exchange at temperatures below 600° C. However, in order to impart any appreciable increase in the abraded strengths of these glass-ceramic bodies, it is necessary to employ relatively long time treatments at lower temperatures, or to effect the ion exchange at temperatures substantially above 600° C., preferably above 700° C.

Although in the recited examples a bath of molten salt was employed as the source of potassium ions and this is the preferred method for undertaking the ion exchange process, it can be appreciated that other sources of potassium ions can be employed which are useful at the temperatures operable in this invention. Thus, the use of pastes and vapors is well-recognized in the ion exchange staining arts. Further, it will be apparent that the most rapid rate of exchange and the highest strengths will normally be effected where pure potassium ion-containing materials are utilized as the exchange medium although some contamination can be tolerated. Nevertheless, the determination of the maximum amount of contamination that can be tolerated is believed to be well within the ingenuity of one of ordinary skill in the art.

This invention is founded upon the exchange of potassium ions for sodium ions in the crystal structure of nepheline. That such an exchange truly does take place is confirmed through X-ray diffraction analysis of the surface crystals before and after the ion exchange reaction demonstrating the transformation of nepheline to kalsilite. This conversion of nepheline is clearly evident from an examination of the following table which records several of the $d$-spacings and the intensities observed thereat in an X-ray dicraction pattern made of the surface crystallization of Example 3 prior to and after the ion exchange reaction. The intensities are arbitrarily reported as very strong (vs), strong (s), moderate (m), and weak (w).

| Before Exchange | | 52% KCl–48% $K_2SO_4$, 8 hours at 775° C. | |
|---|---|---|---|
| d | I | d | I |
| 4.98 | w | | |
| 4.31 | m | | |
| 41.5 | s | 4.25 | m |
| 3.82 | vs | 3.97 | s |
| 3.51 | w (anatase) | 3.51 | w (anatase) |
| 3.27 | s | | |
| 3.01 | vs | 3.10 | vs |
| 2.88 | m | | |
| 2.57 | w | 2.59 | s |
| 2.49 | w | | |
| 2.34 | m | 2.41 | w |
| 2.30 | w | | |
| 2.08 | w | 2.15 | m |
| 1.89 | w (anatase) | 1.89 | w (anatase) |

This table amply demonstrates the change in crystal structure which the nepheline in the surface layer of the glass-ceramic article undergoes during the ion exchange process. Thus, the X-ray diffraction pattern exhibited by the surface crystals after ion exchange with potassium ions is very similar to that exhibited by kalsilite.

Since, as has been explained above, the sodium ions in the glass-ceramic articles are essentially absent from the glassy matrix, the ion exchange reaction leading to the surface compression layer must necessarily take place within the crystals. And, whereas nepheline comprises the majority of the crystals present, minor amounts of other crystals can be present. But, inasmuch as the existence of these extraneous crystals can dilute the maximum strengthening effect which can be achieved where nepheline constitutes the sole crystal phase, it is much preferred to maintain the sum of all such incidental crystallization less than about 20% of the total thereof.

While the invention has been illustratively described with respect to particular compositions and methods of treatment, it should be understood that similar effects may be attained on other glass-ceramic materials containing a nepheline crystal phase by similar types of treatment. Other variations and modifications of the invention will also become apparent from this description and are contemplated within the scope of the appended claims.

We claim:

1. A unitary glass-ceramic article of high strength wherein the crystal content thereof constitutes at least 70% by weight of the article and having an integral surface compressive stress layer consisting essentially of kalsilite as the crystal phase derived from nepheline crystals originally in said surface layer and an interior portion consisting essentially of nepheline as the crystal phase.

2. A glass-ceramic article according to claim 1 wherein said interior portion consists essentially of $Na_2O$, $Al_2O_3$, and $SiO_2$.

3. A glass-ceramic article according to claim 1 wherein said interior portion consisting essentially, by weight on the oxide basis, of about 5–20% $Na_2O$, 25–50% $Al_2O_3$, 25–50% $SiO_2$, and 5–10% $TiO_2$.

4. A method for producing a unitary glass-ceramic article of high strength wherein the crystal content thereof constitutes at least 70% by weight of the article and having an integral surface compressive stress layer and an interior portion which comprises contacting a glass-ceramic article consisting essentially of $Na_2O$, $K_2O$, $Al_2O_3$ and $SiO_2$ and consisting essentially of nepheline as the crystal phase at a temperature between about 400°–800° C. with a source of exchangeable potassium ions for a period of time sufficient to replace at least part of the sodium ions of said nepheline in a surface layer of the article with potassium ions to convert said nepheline to kalsilite, thereby effecting an integral compressively stressed surface layer on the article.

5. A method according to claim 4 wherein said glass-ceramic article consists essentially of $Na_2O$, $Al_2O_3$, and $SiO_2$.

6. A method according to claim 4 wherein said glass-ceramic article consists essentially, by weight on the oxide basis, of about 5–20% $Na_2O$, 25–50% $Al_2O_3$, 25–50% $SiO_2$, and 5–10% $TiO_2$.

7. A method according to claim 4 wherein said glass-ceramic article is contacted with a source of exchangeable potassium ions at a temperature between about 600°–800° C.

8. A method according to claim 4 wherein said glass-ceramic article is contacted with a source of exchangeable potassium ions for a period of time ranging about 2–100 hours.

References Cited

UNITED STATES PATENTS

| | | | |
|---|---|---|---|
| 2,779,136 | 1/1957 | Hood et al. | 65—30X |
| 3,218,220 | 11/1965 | Weber | 65—30X |
| 3,282,770 | 11/1966 | Stookey et al. | 65—30X |
| 3,482,513 | 2/1969 | Denman | 65—33X |

OTHER REFERENCES

Kistler, S. S.: "Stresses in Glass Produced by Non Uniform Exchange of Monovalent Ions," J. of Am. Cer. Soc., vol. 45, No. 2, pp. 59–68, February 1962.

S. LEON BASHORE, Primary Examiner

J. H. HARMAN, Assistant Examiner

U.S. Cl. X.R.

65—30, 33

UNITED STATES PATENT OFFICE
CERTIFICATE OF CORRECTION

Patent No. 3,573,073         Dated March 30, 1971

Inventor(s) David A. Duke, Bruce R. Karstetter, Stanley S. Lewek and Robert W. Pfitzenmaier It is certified that error appears in the above-identified patent and that said Letters Patent are hereby corrected as shown below:

Column 1, line 7, insert -- assignors to Corning Glass Works Corning, N. Y. 14830 --.

Column 4, line 61, change "0.08-0.05%" to -- 0.08-0.50% --

Column 8, line 67, in the Table under the heading "Before Exchange", change "41.5" to -- 4.15 --.

Signed and sealed this 15th day of February 1972.

(SEAL)
Attest:

EDWARD M. FLETCHER, JR.        ROBERT GOTTSCHALK
Attesting Officer              Commissioner of Patents